(12) United States Patent
Woodruff et al.

(10) Patent No.: US 12,021,911 B2
(45) Date of Patent: *Jun. 25, 2024

(54) MANAGING ENCODER UPDATES

(71) Applicant: Amazon Technologies, Inc., Seattle, WA (US)

(72) Inventors: Eric Woodruff, Beaverton, OR (US); Ryan Paul Hegar, Happy Valley, OR (US); Khawaja Salman Shams, Portland, OR (US)

(73) Assignee: Amazon Technologies, Inc., Seattle, WA (US)

(*) Notice: Subject to any disclaimer, the term of this patent is extended or adjusted under 35 U.S.C. 154(b) by 273 days.

This patent is subject to a terminal disclaimer.

(21) Appl. No.: 17/453,618

(22) Filed: Nov. 4, 2021

(65) Prior Publication Data
US 2022/0060530 A1 Feb. 24, 2022

Related U.S. Application Data

(63) Continuation of application No. 15/841,138, filed on Dec. 13, 2017, now Pat. No. 11,172,010.

(51) Int. Cl.
*H04L 65/70* (2022.01)
*H04L 7/00* (2006.01)
(Continued)

(52) U.S. Cl.
CPC ............ *H04L 65/70* (2022.05); *H04L 7/0008* (2013.01); *H04L 67/148* (2013.01);
(Continued)

(58) Field of Classification Search
CPC ..... H04L 65/70; H04L 7/0008; H04L 67/148; H04L 67/02; H04N 21/4402; H04N 21/8547
See application file for complete search history.

(56) References Cited

U.S. PATENT DOCUMENTS 10,320,952 B2    6/2019   Raveh et al.
10,419,785 B2    9/2019   Davies
(Continued)

*Primary Examiner* — Moustafa M Meky
*Assistant Examiner* — Kidest Mendaye
(74) *Attorney, Agent, or Firm* — Knobbe, Martens, Olson & Bear, LLP

(57) ABSTRACT

A video packaging and origination service can include one or more encoder components that receive content for encoding and transmitting to requesting entities. During the operation of the encoder components, a management service associated with the video packaging and origination service can receive information related to updates or modifications to the encoder components. Responsive to the information, the management service can instantiate and configure an updated encoder. Once the updated encoder component is instantiated and configured, both the updated and target encoder components receive content for streaming, encode content and generating encoding content. Additionally, the updated encoder component can initiate a notification to the target encoder component that a handover will be occurring and begin a negotiation process identifying a handover event. Based on the negotiated handover event, the target encoder component can illustratively cease operation upon evaluation and detection of the handover event.

20 Claims, 9 Drawing Sheets

(51) Int. Cl.
  *H04L 67/148* (2022.01)
  *H04N 21/4402* (2011.01)
  *H04N 21/8547* (2011.01)
  *H04L 67/02* (2022.01)

(52) U.S. Cl.
  CPC ..... *H04N 21/4402* (2013.01); *H04N 21/8547* (2013.01); *H04L 67/02* (2013.01)

(56) References Cited

U.S. PATENT DOCUMENTS

| | | |
|---|---|---|
| 2010/0162226 A1 | 6/2010 | Borissov et al. |
| 2011/0261695 A1 | 10/2011 | Zhao et al. |
| 2012/0128061 A1* | 5/2012 | Labrozzi ............ H04N 21/8456 375/E7.126 |
| 2013/0019236 A1 | 1/2013 | Nakagawa et al. |
| 2014/0075425 A1* | 3/2014 | Stevenson ............... G06F 8/656 717/171 |
| 2014/0153640 A1 | 6/2014 | Zhao et al. |
| 2014/0304385 A1* | 10/2014 | Lee .................... H04L 12/2834 709/223 |
| 2014/0344443 A1 | 11/2014 | MacInnis et al. |
| 2015/0003517 A1 | 1/2015 | Misumi |
| 2015/0172691 A1 | 6/2015 | Annamraju et al. |
| 2015/0215169 A1 | 7/2015 | Mital et al. |
| 2016/0197793 A1 | 7/2016 | Nakamoto |
| 2017/0331926 A1* | 11/2017 | Raveh ..................... H04L 69/14 |
| 2018/0018160 A1 | 1/2018 | Teraoka et al. |
| 2018/0084084 A1* | 3/2018 | Sharma ............... H04L 12/1407 |
| 2018/0324235 A1 | 11/2018 | Mufti |
| 2018/0338017 A1* | 11/2018 | Mekuria ............. H04L 67/1097 |
| 2018/0343468 A1* | 11/2018 | Harrell ................. H04N 19/157 |
| 2019/0166178 A1 | 5/2019 | Beheydt et al. |

\* cited by examiner

MANAGING ENCODER UPDATES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Generally described, computing devices and communication networks can be utilized to exchange data and/or information. In a common application, a computing device can request content from another computing device via the communication network. For example, a user at a personal computing device can utilize a browser application to request a content page (e.g., a network page, a Web page, etc.) from a server computing device via the network (e.g., the Internet). In such embodiments, the user computing device can be referred to as a client computing device and the server computing device can be referred to as a content provider.

Content providers provide requested content to client computing devices often with consideration of image quality of the requested content as reconstructed at the client computing device. Artifacts resulting from the encoding process can lead to degradation of content image when it is reconstructed at the client computing device.

Some content providers attempt to facilitate the delivery of requested content through the utilization of a content delivery network ("CDN") service provider. As with content providers, CDN service providers also provide requested content to client computing devices often with consideration of image quality of the requested content to the client computing device. Accordingly, CDN service providers often consider image quality as part of the delivery service.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
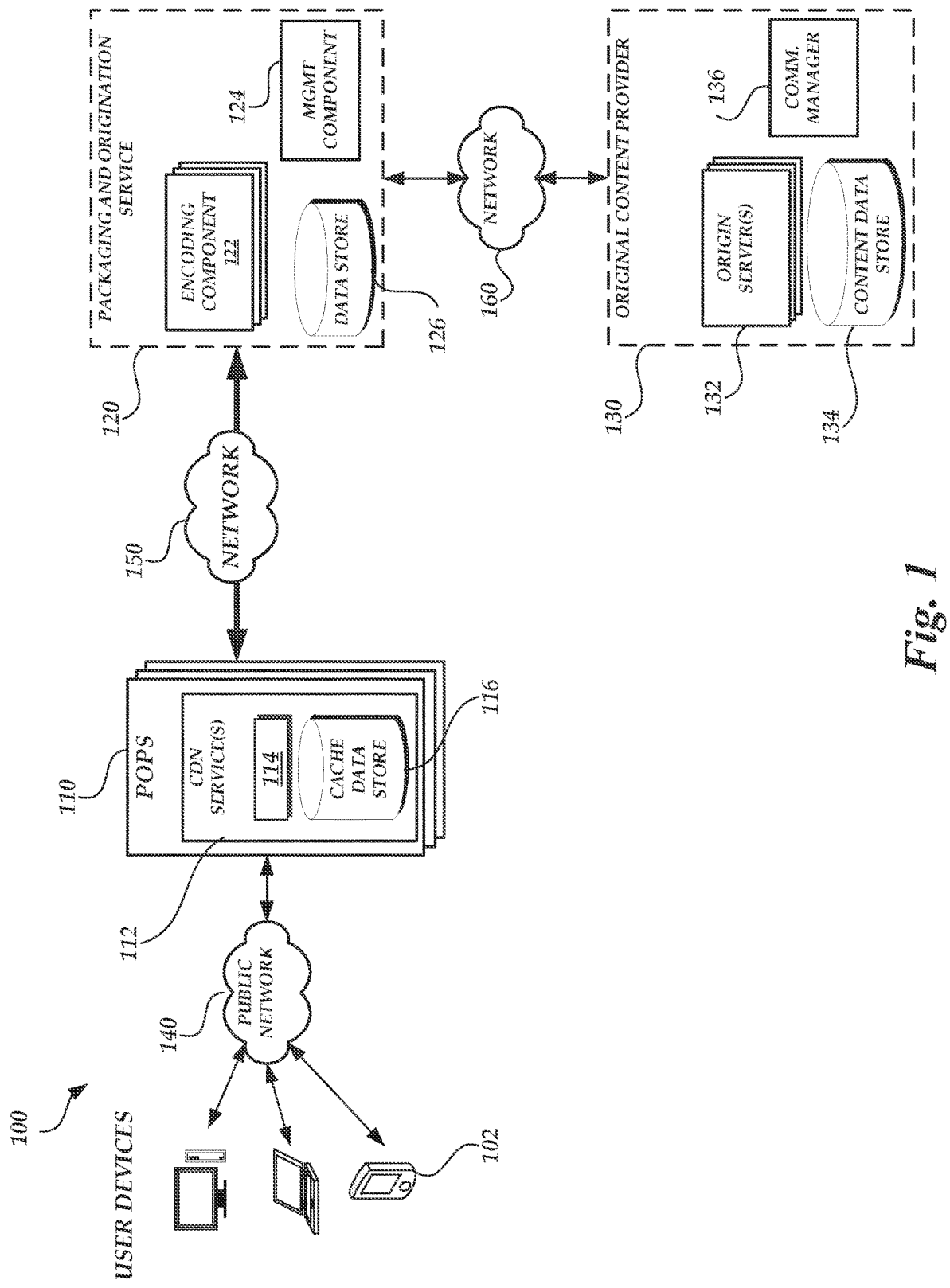
FIG. 1 is a block diagram of a content delivery environment that includes one or more client devices, one or more edge locations, and a video packaging system in accordance with some embodiments.

Generally described, content providers can provide content to requesting users. With regard to video content, a content provider can implement a video packaging and origination service that is able to deliver video content to requesting users. Still further, the content provider or packaging and origination service can utilize a CDN or other content delivery component to deliver video content to requesting users or client computing devices utilizing streaming transmissions in accordance with one of a range of communication protocols, such as the hypertext transfer protocol ("HTTP").

Content providers can organize requested content, such as a video file, into multiple segments that are then transmitted to requesting devices segment by segment. For example, in a video stream, each segmented portion typically accounts for 2-10 seconds of video rendered on a receiving device. Each video segment can be encoded by a video packaging and origination service according to an encoding format utilized by the encoder to generate the output stream. The encoding format can correspond to a content representation format for storage or transmission of video content (such as in a data file or bitstream). Examples of encoding formats include but not limited to the motion pictures expert group ("MPEG) MPEG-2 Part 2, MPEG-4 Part 2, H.264 (MPEG-4 Part 10), H.265 high efficiency video coding ("HEVC"), Theora, RealVideo RV40, VP9, and AOMedia Video 1 ("AV1"), and the like.

In some scenarios, a video packaging and origination service can perform maintenance of the video encoder components utilized in the video packaging and origination service. For example, the video packaging and origination service may want to update one or more encoder components to software encoding defects, video quality issues, security issues, or to otherwise modify or enhance the performance of the encoder components. Traditionally, to implement an update to an encoder component, a video packaging and origination service would implement a failover procedure in which a target encoder component would be terminated and a new encoder component having the update would begin operation. In such approaches, however, typical failover scenarios are imperfect because removal of an active encoder component necessarily introduces imperfections to the encoded content delivered to requesting entities, such as user devices or content delivery networks. For example, if an active encoder component is generating content streams that correspond to a channel that corresponds to continuous streaming, the imperfections associated with a failover would present noticeable imperfections in the content presented to consumers.

In some embodiments, a content delivery network can also implement failover or recovery systems that would manage content streams after they have been transmitted from the video packaging and origination service. Such systems can be generally described as downstream error recovery systems and are typically outside of the control or management of the video packaging and origination service. In typical implementation of downstream error recovery systems, the interruption of an active content stream by the target encoder component and introduction of a failover content stream by an updated encoder component can also cause the downstream error recovery systems to buffer content, which creates further lag in substantially live transmissions. Additionally, because downstream error recovery systems are typically outside of the control or management by a video packaging and origination service, such implementations tend to provide for inconsistent user experiences.

Aspects of the present application correspond to a content streaming system and methodology for managing encoder components. More specifically, in an illustrative embodiment, a video packaging and origination service can include one or more encoder components that receive content for encoding and transmitting to requesting entities. Illustratively, the content can be provided by an original content provider, which configures the video packaging and origination service to encode one or more content streams in response to requests for the content streams. Individual encoder components receive or access content, encode the content according to one or more encoding profiles defined by an encoding bitrate and format, and make the encoded content streams available for transmission.

During the operation of the encoder components, a management service associated with the video packaging and origination service can receive information related to updates or modifications to the encoder components. Responsive to the information, the management service can cause the instantiation and configuration of an updated encoder component that will function as a replacement for the target encoder component. In one embodiment, the updated encoder component can correspond to a stand-alone instance of an encoder component (either a physical computing device or virtualized implementation) that can be selected or instantiated and configured by the management service. In another embodiment, the updated encoder component can correspond to a logical implementation in a virtualized network in which the updated encoder component corresponds to a duplicated child process of the current target encoder component.

Once the updated encoder component is instantiated and configured, both the updated and target encoder components receive content for streaming, encode content and generating encoding content. Illustratively, both the updated encoder component and target encoder component can utilize the same inputs, including synchronization information (e.g., timestamp information, timecode sequences or sequence numbers) to ensure that the encoded output is substantially interchangeable or substantially similar. Additionally, the updated encoder component can initiate a notification to the target encoder component that a handover will be occurring and begin a negotiation process identifying a handover event at which time the updated target encoder component will cease operation or otherwise have a lower priority than the updated encoder component. For example, the handover event can correspond to an identification of a frame number in the encoded content stream or a timestamp associated with the content stream.

Based on the negotiated handover event, the target encoder component can illustratively cease operation upon evaluation and detection of the handover event or otherwise include some designation that the output of the target encoder component should not be used. The target encoder component can generate a notification regarding the determination of the handover event and confirmation of a change in operation. At the same time, the updated encoder component continues to operate in an uninterrupted manner such that the handover event associated with the target encoder component does not create the imperfections associated with the traditional embodiments described above or otherwise cause the buffering of content streams (due to interruption) in downstream error processing systems.

FIG. 1 illustrates a general content delivery environment 100 for delivering content from original content providers to user devices. The content delivery environment 100 includes a plurality of devices 102 utilized by individual users, generally referred to as client computing devices, to request streaming or download content from a video packaging and origination service 120. Illustratively, the video packaging and origination service 120 indexes a collection of source video content (either live streaming or file-based video-on-demand) and delivers it to clients via a wide range of communication protocols such as HTTP Live Streaming ("BLS"), Dynamic Adaptive Streaming over HTTP ("DASH"), HTTP Dynamic Streaming ("HDS"), Real Time Messaging Protocol ("RTMP"), Smooth Streaming, and the like. Based on consumer demand, a video packaging and origination service 120 can also provide advanced video transmission features such as just-in-time packaging of video content, digital rights management ("DRM") encryption, time-shifting, bitrate selection, catch up TV, and more. The content can be illustratively provided by one or more origin sources, such as original content provider 130.

Client computing devices 102 may include any number of different computing devices capable of communicating with the networks 140, 150, 160, via a direct connection or via an intermediary. For example, individual accessing computing devices may correspond to a laptop or tablet computer, personal computer, wearable computer, server, personal digital assistant ("PDA"), hybrid PDA/mobile phone, mobile phone, electronic book reader, set-top box, camera, appliance (e.g., a thermostat or refrigerator), controller, digital media player, watch, eyewear, a home or car device, Internet of Things ("IoT") devices, virtual reality or augmented reality devices, and the like. Each client computing device 102 may optionally include one or more data stores (not shown in FIG. 1) including various applications or computer-executable instructions, such as web browsers, used to implement the embodiments disclosed herein. Illustrative components of a client computing device 102 will be described with regard to FIG. 2.

In some embodiments, a CDN service provider 110 may include multiple edge locations from which a user device can retrieve content. Individual edge location 112 may be referred to herein as a point of presence ("POP"), where a POP is intended to refer to any collection of related computing devices utilized to implement functionality on behalf of one or many providers. POPs are generally associated with a specific geographic location in which the computing devices implementing the POP are located, or with a region serviced by the POP. As illustrated in FIG. 1, the POP 110 can include one or more metric information processing components 114 for processing information provided by client computing devices 102 and for managing content provided by the video packaging and origination service 120. The POP 112 can further include a data store 116 for maintaining collected information. For example, a data center or a collection of computing devices within a data center may form a POP. In some instances, the POPs may implement one or more services, such as CDN services, data storage services, data processing services, etc. The CDN service provider 110 may include multiple POPs located in different geographic locations so that user devices can communicate with a nearby a POP to retrieve content, thereby reducing the latency of delivering requested content.

Networks 140, 150, 160 may be any wired network, wireless network, or combination thereof. In addition, the networks 140, 150, 160 may be a personal area network, local area network, wide area network, cable network, fiber network, satellite network, cellular telephone network, data network or combination thereof. In the example environment of FIG. 1, network 140 is a global area network ("GAN"), such as the Internet. Protocols and components for communicating via the other aforementioned types of communication networks are well known to those skilled in the art of computer communications and thus, need not be described in more detail herein. While each of the client computing devices 102 and CDN service provider 110 are depicted as having a single connection to the network 140, individual components of the client computing devices 102 and CDN service provider 110 may be connected to the network 140 at disparate points. Accordingly, communication times and capabilities may vary between the components of FIG. 1. Likewise, although FIG. 1 is illustrated as having three separate networks 140, 150, 160, one skilled in the relevant art will appreciate that the video packaging and origination service 120 may utilize any number or combination of networks.

The original content providers 130 may include one or more servers 132 for delivering content, a data store 134 for maintaining content and a communication manager 136 for facilitating communications to the video packaging and origination service 120 over network ° 160.

In accordance with embodiments, the video packaging and origination service 120 includes a set of encoding components 122 for receiving content provided by the original content providers 130 (or other source) and processing the content to generate a set of encoded video segments available for delivery. The video packaging and origination service 120 can further include a data store 126 for maintaining collected content streaming information, update information, or configuration information. The video packaging and origination service 120 is further associated with a management component 124 to facilitate the determination of an update to one or more target encoder components, cause an instantiation of updated encoder components and cause or confirm a handover event or stop event. The management component 124 can delegate at least some portion of the identified functionality to the encoder components themselves, such as the determination or negotiation of the handover or stop events.

It will be appreciated by those skilled in the art that the video packaging and origination service 120 and information processing component 114 may have fewer or greater components than are illustrated in FIG. 1. Thus, the depiction of the video packaging and origination service 120 and the information processing component 114 in FIG. 1 should be taken as illustrative. For example, in some embodiments, components of the video packaging and origination service 120 and the processing component 114 may be executed by one more virtual machines implemented in a hosted computing environment. A hosted computing environment may include one or more rapidly provisioned and released computing resources, which computing resources may include computing, networking or storage devices.

Figure 2:
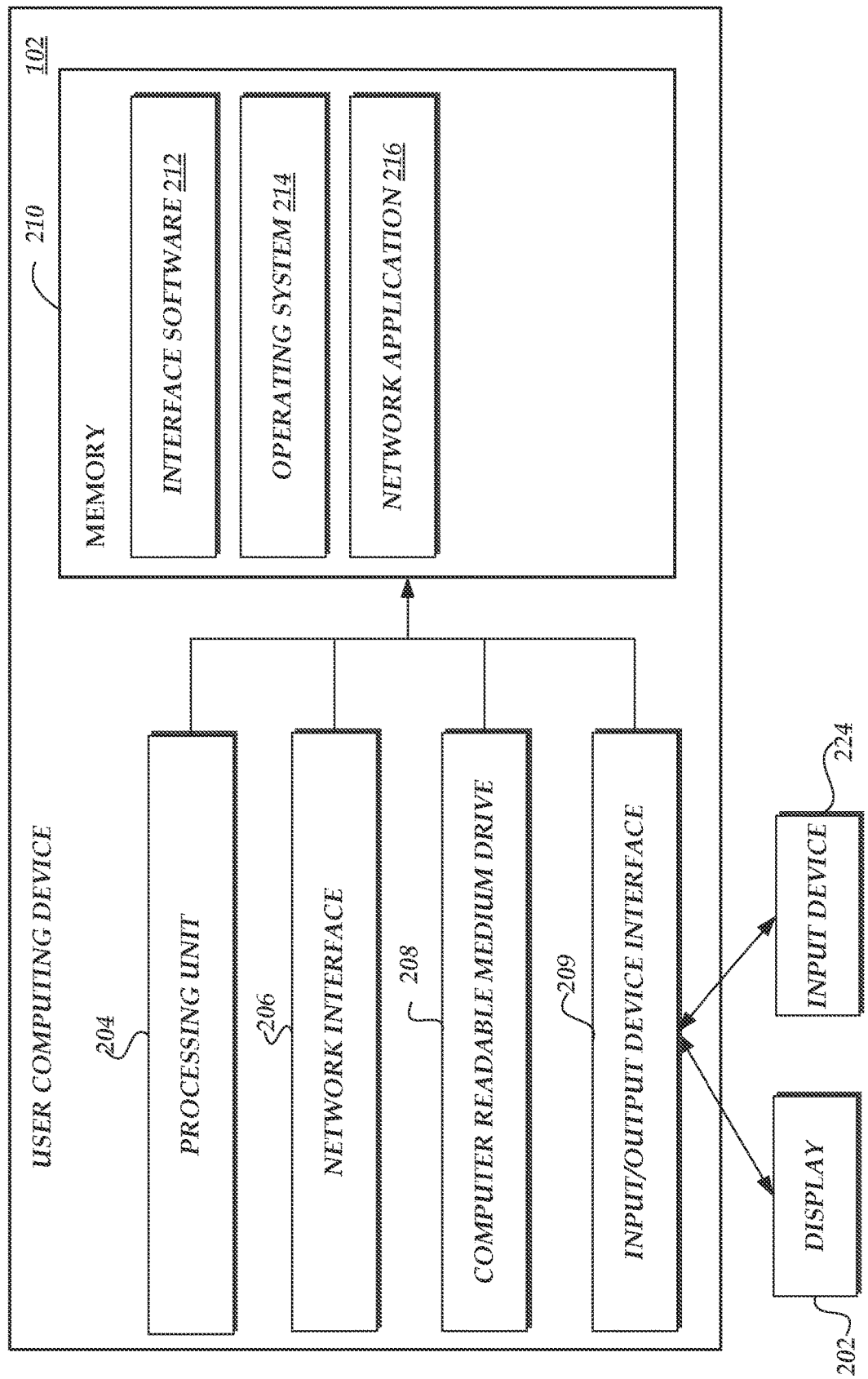
FIG. 2 is a block diagram of illustrative components of a client computing device configured to remotely process content in accordance with some embodiments.

FIG. 2 depicts one embodiment of an architecture of an illustrative user computing device 102 that can generate content requests and process metric information in accordance with the present application. The general architecture of the user computing device 102 depicted in FIG. 2 includes an arrangement of computer hardware and software components that may be used to implement aspects of the present disclosure. As illustrated, the user computing device 102 includes a processing unit 204, a network interface 206, an input/output device interface 209, an optional display 202, and an input device 224, all of which may communicate with one another by way of a communication bus.

The network interface 206 may provide connectivity to one or more networks or computing systems, such as the network 140 of FIG. 1 and the video packaging and origination service 120 or the original content provider 130. The processing unit 204 may thus receive information and instructions from other computing systems or services via a network. The processing unit 204 may also communicate to and from memory 210 and further provide output information for an optional display 202 via the input/output device interface 209. The input/output device interface 209 may also accept input from the optional input device 224, such as a keyboard, mouse, digital pen, etc. In some embodiments, the user computing device 102 may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the user computing device 102. The memory 210 may further include computer program instructions and other information for implementing aspects of the present disclosure. For example, in one embodiment, the memory 210 includes interface software 212 for requesting and receiving content from the video packaging and origination service 120 via the CDN service provider 110. For example, in one embodiment, the memory 210 includes a network application 216, such as browser application or media player, for accessing content, decoding the encoded content, and communicating with the CDN service provider 110.

Figure 3:
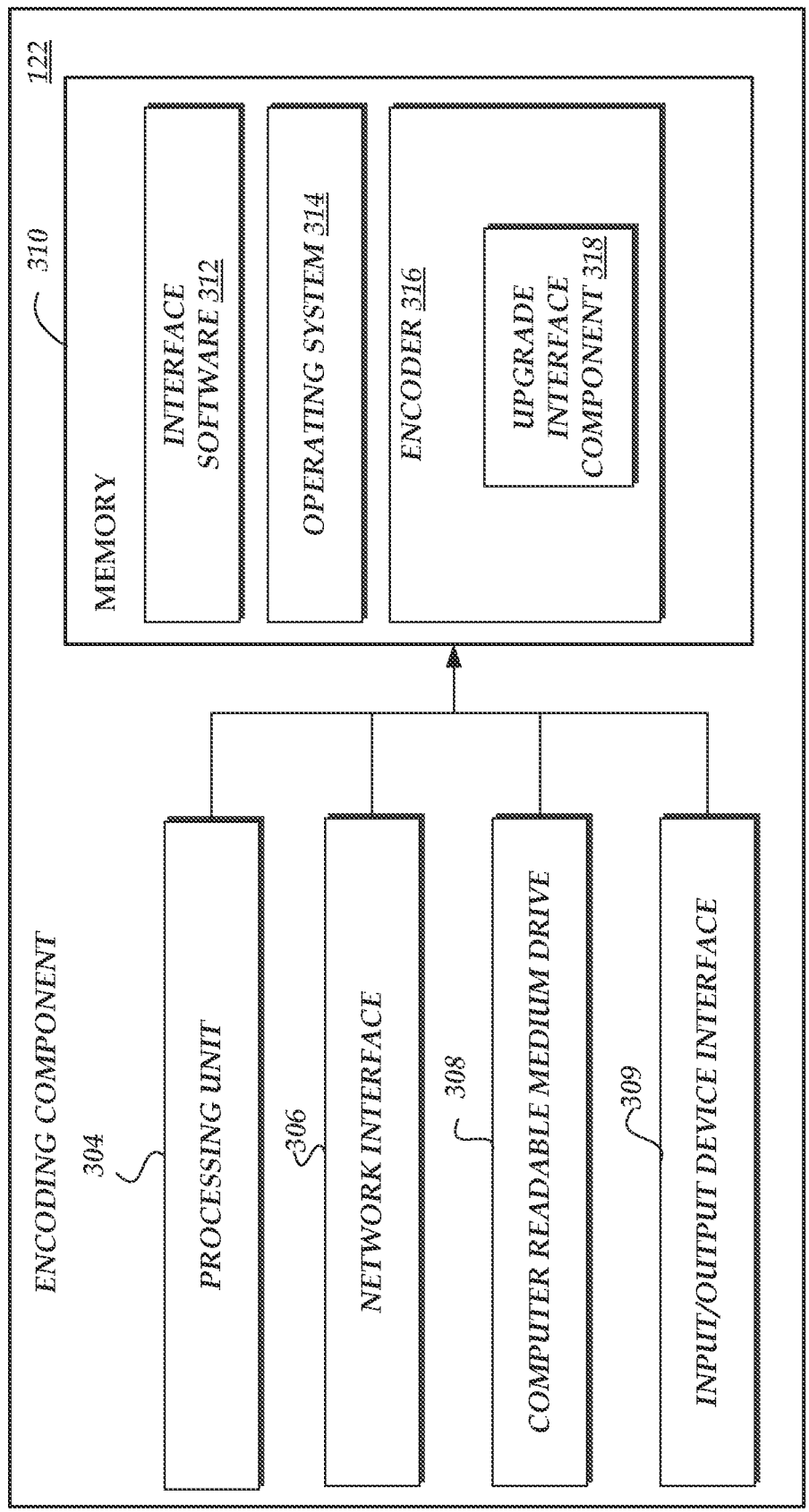
FIG. 3 is a block diagram of illustrative components of an encoder of a packaging and origination service configured to manage sample adaptive offset filter parameters for implementation in content encoding in accordance with some embodiments.

FIG. 3 depicts one embodiment of an architecture of an illustrative encoding component 122 for implementing the video packaging and origination service 120 described herein. The general architecture of the encoding component 122 depicted in FIG. 3 includes an arrangement of computer hardware and software components that may be used to implement aspects of the present disclosure. As illustrated, the encoding component 122 of the video packaging and origination service 120 includes a processing unit 304, a network interface 306, a computer readable medium drive 308, and an input/output device interface 309, all of which may communicate with one another by way of a communication bus. The components of the encoding component 122 may be physical hardware components or implemented in a virtualized environment.

The network interface 306 may provide connectivity to one or more networks or computing systems, such as the network 150 or network 160 of FIG. 1. The processing unit 304 may thus receive information and instructions from other computing systems or services via a network. The processing unit 304 may also communicate to and from memory 310 and further provide output information for an optional display via the input/output device interface 309. In some embodiments, the encoding component 122 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the video packaging and origination service 120. The memory 310 may further include computer program instructions and other information for implementing aspects of the present disclosure. For example, in one embodiment, the memory 310 includes interface software 312 for receiving and processing content requests from user devices 102. Memory 310 includes an encoder 316 for encoding video segments to be sent to user devices 102 in response to content requests.

As will be described in detail below, the encoder 316 includes an upgrade interface component 318 for managing the interactions between the target encoder components and updated encoder components. Illustratively, both the target encoder component and updated encoder component can correspond to the architecture illustrated in FIG. 3. In that regard, an updated encoder component that replaces a target encoder component can in turn become a target encoder component to be subsequently replaced by another updated encoder component. Illustratively, the upgrade interface component 316 can function to transmit timing and synchronization information to an encoder component functioning as an updated encoder component. The timing and synchronization information can include timing information, such as time stamp, timecode sequence or sequence numbers, that allow two encoder components 122 to generate outputs that are substantially interchangeable based on having common reference information. The timing and synchronization information can further include a determination/definition of a handover event that will indicate a point in time in which the target encoder component will cease to generate output or otherwise designate an output as having a lower priority than an updated encoder component. The handover event can be illustratively specified by a frame number or timestamp information related to the encoded content. Symmetrically, the upgrade interface component 316 can function to receive and process timing and synchronization information to an encoder component functioning as a target encoder component. Although the exchange of timing and synchronization information will be illustrated as a single interaction between two encoder components 122, the exchange of timing and synchronization information may include a number of interactions.

As specified above, in one embodiment, the encoder components 122 illustrated in FIG. 3 can be implemented as physical computing devices or virtualized computing devices in a computing network. In another embodiment, the encoded components 122 may be implemented as logical components in a virtual computing network in which the functionality of the encoder components are implemented by an underlying substrate network of physical computing devices. In this embodiment, the logical encoder components may not be actually instantiated in the physical computing devices of the substrate network. Accordingly, reference to instantiation of the encoder components can correspond to a configuration of physical computing devices functioning as encoder components, instantiation of virtualized computing devices functioning as encoder components or instantiation of logical components in a virtualized network. In each of these examples, the creation, configuration and implementation of the components and the interactions described herein would vary according to the specific instantiation of the encoder component. Thus, aspects of the present application should not be limited to interpretation requiring a physical, virtual or logical embodiment unless specifically indicated as such.

Figure 4A:
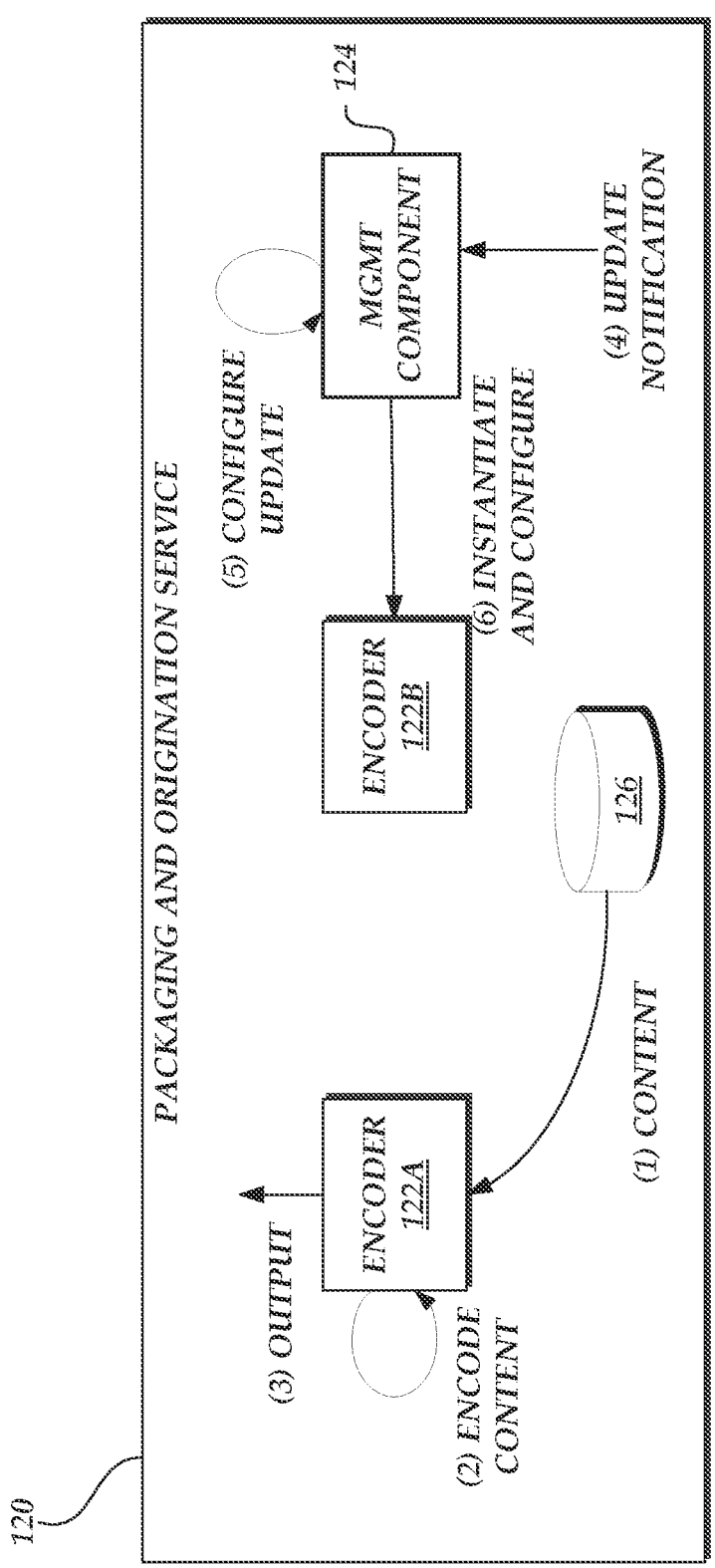
FIGS. 4A-4C are block diagrams of the content delivery environment of FIG. 1 illustrating the interaction in updating encoders in accordance with some embodiments.
Figure 4B:
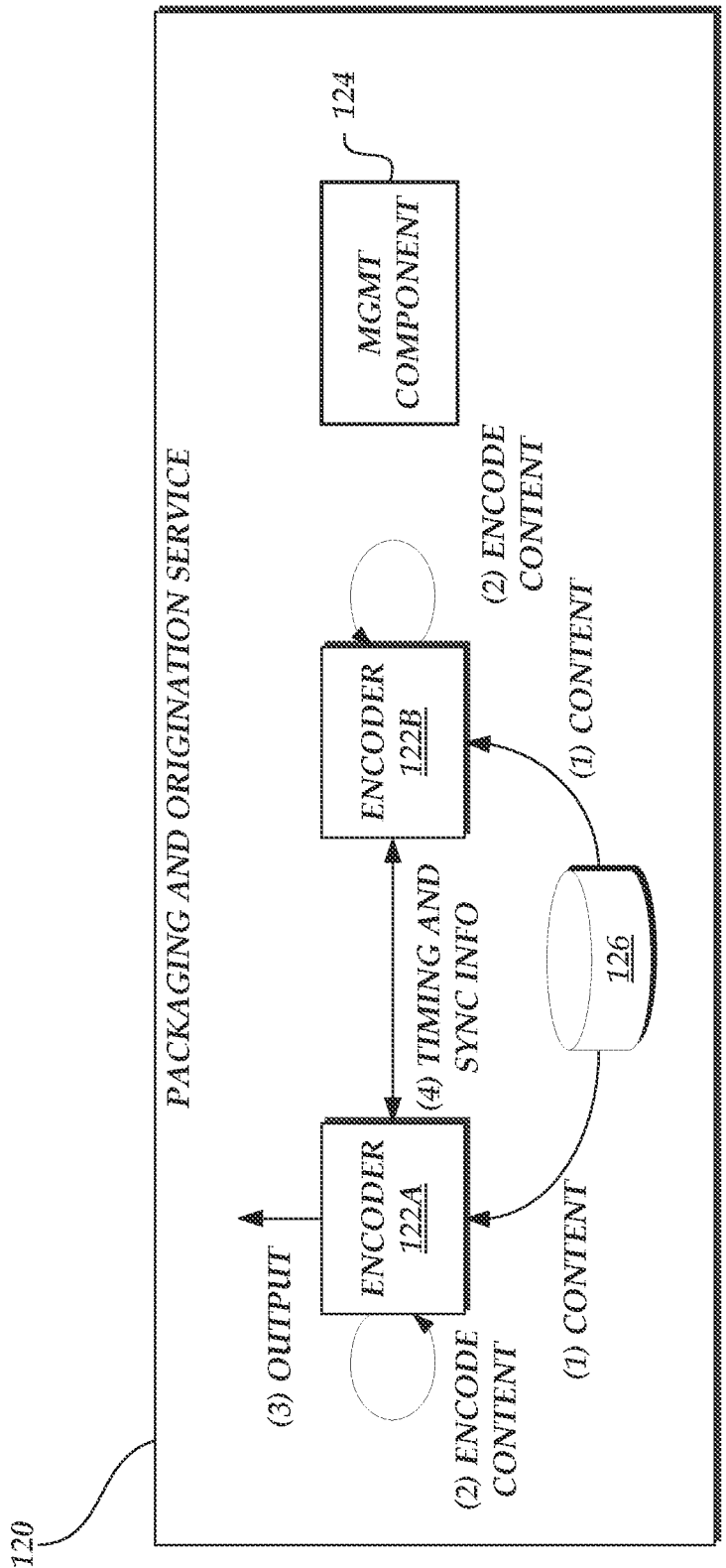
Figure 4C:
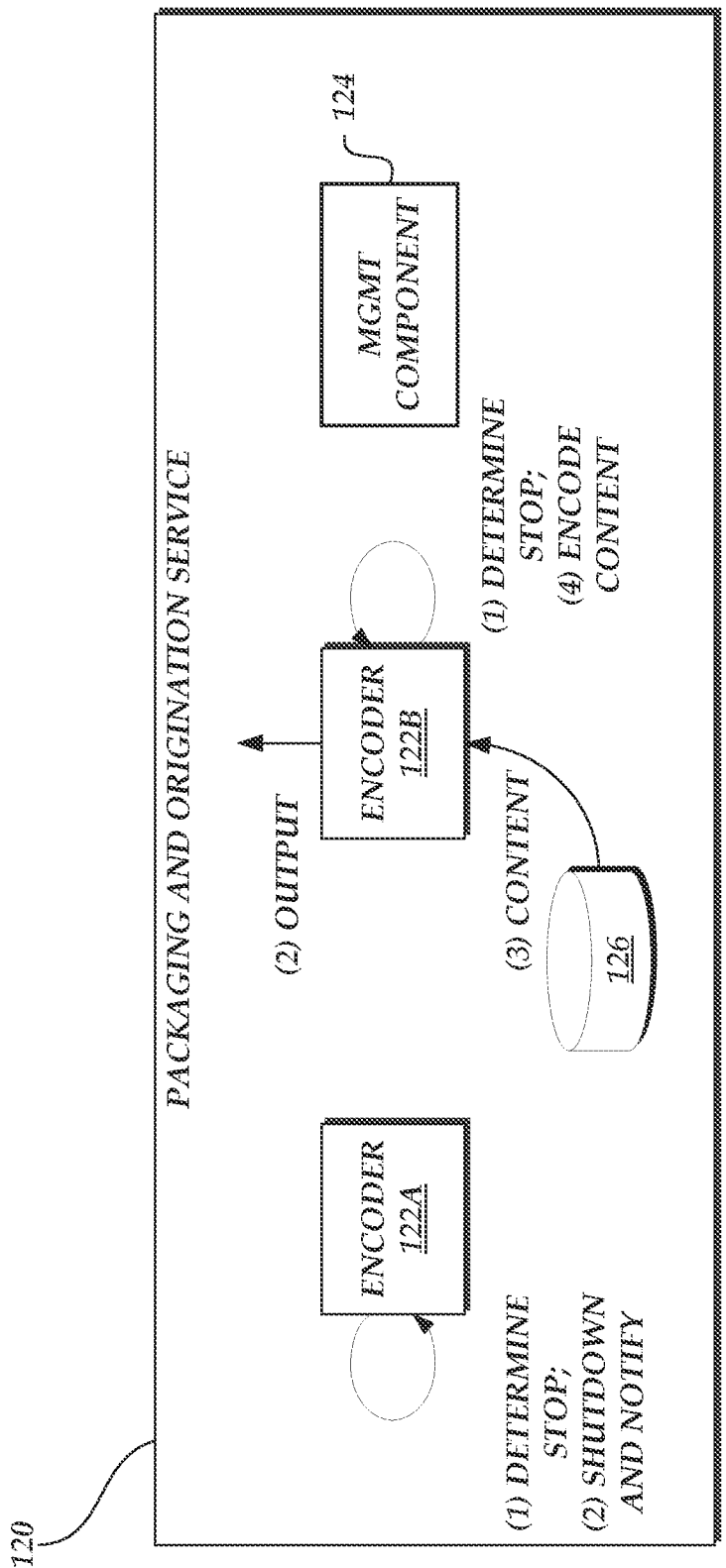

Turning now to FIGS. 4A-4C, an illustrative interaction for the updating of encoder components 122 will be described. For purposes of illustration, FIGS. 4A-4C illustrate interaction between the components of the video packaging and origination service 120. Such interaction is representative in nature and could include a number of additional components or interactions. Additionally, although logically represented as components within the video packaging and origination service 120, one skilled in the relevant art will appreciate that implementation of the components can be accomplished in many ways. The interaction of FIGS. 4A-4C illustratively occur after the video packaging and origination service 120 as received a requesting entity request for streaming content and an original content provider 130 has provided the requested content to the video packaging and origination service 120.

For purposes of illustration, the content request from the user device 102 can be accomplished via access to one or more software applications on the user device to request content, such as streaming content. For example, the user device can generate an interface for receiving user commands or interactions and transmit the request. The initial content request may be transmitted directly to the video packaging and origination service 120 and then sent to a selected content delivery network POP 110. Alternatively, the initial content request may be routed, such as via DNS routing or HTTP-based routing, to a POP 110. For purposes of illustration, the receiving POP 110 may not have a copy of the requested file and may need to retrieve at least a portion of the requested content.

Additionally, the original content provider 130 transmits the streaming content in a number of ways from the original content provider 130 to the video packaging and orientation service 120. At the video packaging and orientation service 120, an ingress component or other processing component can decode incoming content and make it available for encoding and transmission to the user device 102.

With reference to FIG. 4A, encoder component 122A will illustratively function as the target encoder that is subject to update and encoder component 122B will function as the updated encoder. At (1), the target encoder 122A receives or accesses the content for transmission. The target encoder component 122A can obtain the content from data store 126 in embodiments in which the content has been received and processed. At (2), the encoding component 122A encodes the content according to one or more encoding profiles (e.g., combinations of encoding bitrate and format) corresponding to the content streams being provided to the requesting entities. As described above, by way of example, examples of encoding formats include but not limited to the motion pictures expert group ("MPEG) MPEG-2 Part 2, MPEG-4 Part 2, H.264 (MPEG-4 Part 10), high efficiency video coding ("HEVC"), Theora, RealVideo RV40, VP9, and AOMedia Video 1 ("AV1"), and the like. At (3), the target encoder component 122A generates the outputs. Illustratively, the video packaging and origination service 120 can have additional components that receive the output streams from the encoder component 122A for transmission to the requesting entities.

At some point during the encoding process, at (4), the management component 124 of the video packaging and origination service 120 receives or generates updates to the encoder components. Illustratively, the update notification can include an identification of individual encoder components 122 to be "updated", identification of types of encoder to be updated, timing information regarding the implementation of updates, additional processing information, and the like. The update notification can include executable code corresponding to the updated encoder or to change existing encoder information, configuration information utilized to configure an instantiated updated encoder, or an identification of location of executable code or configuration information.

At (6), the management component 124 instantiates, or causes to be instantiated, an updated encoder 122B. As described above, in one embodiment, the encoder component 122B can be implemented as physical computing devices or virtualized computing devices in a computing network. In another embodiment, the encoded component 122B may be implemented as logical components in a virtual computing network in which the functionality of the encoder components are implemented by an underlying substrate network of physical computing devices. In this embodiment, the logical encoder components may not be actually instantiated in the physical computing devices of the substrate network. Accordingly, reference to instantiation of the encoder components can correspond to a configuration of physical computing devices functioning as encoder components, instantiation of virtualized computing devices functioning as encoder components or instantiation of logical components in a virtualized network. Illustratively, the instantiation of the updated encoder component 122B includes configuration information that will allow the encoder component 122B to generate output that is substantially compatible or similar to the output of the target encoder component 122A, including encoding format, encoding process, synchronization information and the like.

Turning to FIG. 4B, after the instantiation of the target encoder component 122B is completed, both the target encoder component 122A and updated encoder component 122B will begin processing the same content and generating substantially similar outputs. At (1), the target encoder component 122A and updated encoder component 122B receive or access the content for transmission. At (2), the target encoder component 122A and updated encoder component 122B encode the content according to the same one or more encoding profiles (e.g., combinations of encoding bitrate and format) corresponding to the content streams being provided to the requesting entities. As described above, by way of example, examples of encoding formats include but not limited to the motion pictures expert group ("MPEG") MPEG-2 Part 2, MPEG-4 Part 2, H.264 (MPEG-4 Part 10), high efficiency video coding ("HEVC"), Theora, RealVideo RV40, VP9, and AOMedia Video 1 ("AV1"), and the like. At (3), the target encoder component 122A and updated encoder component 122B generate outputs. Illustratively, at this point in the illustration, the video packaging and origination service 120 would include additional functionality or components that would be able to receive both output content streams and either discard the updated encoder component 122B stream. Alternatively, updated encoder component 122B may continue to encode content for delivery but not generate any outputs.

At (4), the target encoder component 122A and updated encoder component 122B exchange timing and synchronization information and negotiate a handover or stop event. In one embodiment, the updated encoder component 122B can initiate a notification to the target encoder component 122A that a handover will be occurring and begin a negotiation process identifying a handover event at which time the updated target encoder component will cease operation or otherwise have a lower priority than the updated encoder component. For example, the handover event can correspond to an identification of a frame number in the encoded content stream or a timestamp associated with the content stream. If the target encoder component 122A and updated encoder component 122B outputs are not otherwise synchronized, the target encoder component 122A and updated encoder component 122B can also decide upon synchronization information so that the outputs of the target encoder component 122A and updated encoder component 122B are substantially similar as described above. FIG. 4B illustrates that the timing and synchronization negotiation is managed between the target encoder component 122A and updated encoder component 122B. In other embodiments, the management component 124 may also interact in a manner to facilitate the negotiation or provide the handover event or stop event criteria.

Turning now to FIG. 4C, based on the negotiated handover event, at (1) the target encoder component 122A determines that the handover event or stop event criteria have been met. If so, the target encoder component 122A can cause a shutdown or ceasing of operations, designate its operations with some identifiers or otherwise designate the generated output as able to be discarded or having a lower priority that outputs from the updated encoder component 122B. In the case of a logical implementation of the target encoder component 122A, the underlying substrate network can cause the logical component to "cease" operating by no longer emulating the function or replacing with the emulation of a different logical component. At (2), the target encoder component 122A can generate a notification regarding the determination of the handover event and confirmation of a change in operation.

With continued reference to FIG. 4C, at the same time, the updated encoder component 122B continues to operate in an uninterrupted manner. More specifically, at (1) the updated encoder component 122B determines that the handover event or stop event criteria also have been met. At (2), the updated encoder component 122B can begin generating outputs or having outputs with a higher priority. In this example, the updated encoder component 122B already has content ready for output.

At (3), the updated encoder component 122B continues to receive the content and at (3), encodes the content according to the same one or more encoding profiles (e.g., combinations of encoding bitrate and format) corresponding to the content streams being provided to the requesting entities. At (4), the updated encoder component 122B continues to encode the content and generate outputs. Illustratively, at this point in the illustration, the video packaging and origination service 120 would include additional functionality or components that would be able to receive both output content streams and either discard the target encoder component 122A stream or switch to the output of the updated encoder component 122B. Accordingly, because the output of the target encoder component 122A is not terminated until after the outputs of the updated encoder component 122B are transmitting, there potential for service interruption based on the update is significantly reduced and not subject to the disruptions noticed by the requesting entities.

Figure 5:
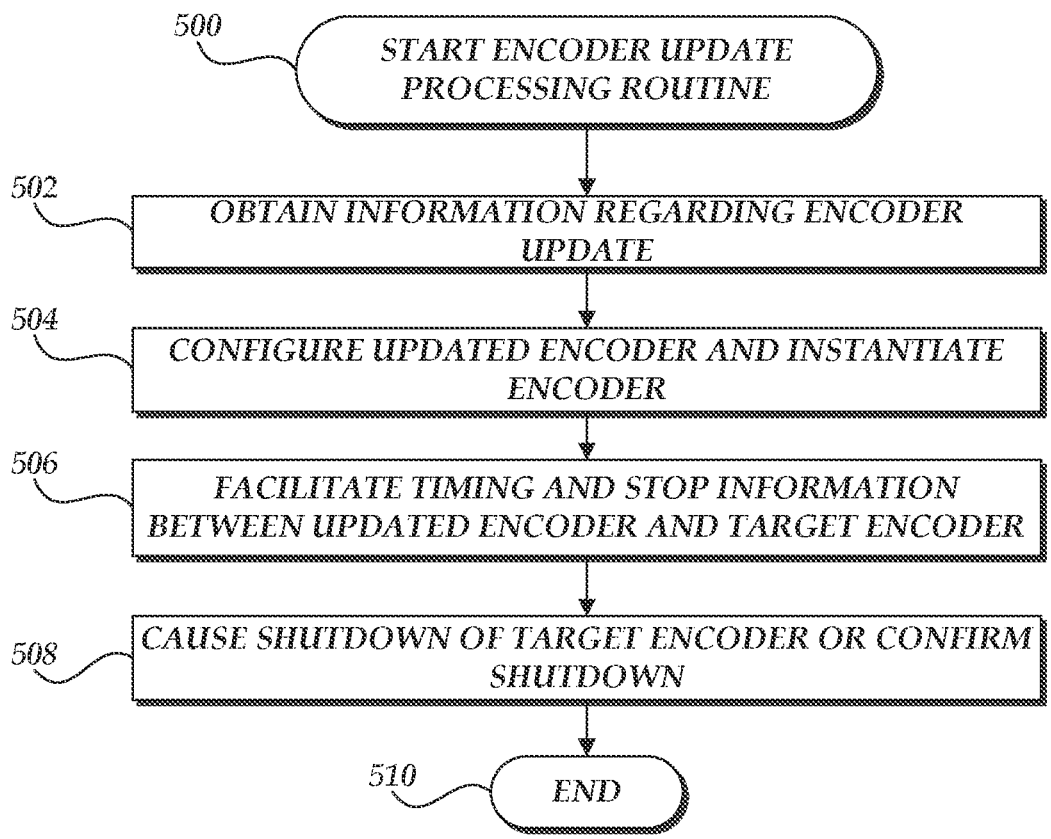
FIG. 5 is a flow diagram illustrative of an encoder update processing routine implemented by a video packaging and origination system in accordance with some embodiments.

Turning now to FIG. 5, a routine 500 for processing encoder component updates will be described. Illustratively, routine 500 will be described with regard to implementation by the video packaging and origination service 120 or the management component 124. At block 502, the management component 124 of the video packaging and origination service 120 receives or generates updates to the encoder components. Illustratively, the update notification can include an identification of individual encoder components 122 to be "updated", identification of types of encoder to be updated, timing information regarding the implementation of updates, additional processing information, and the like. The update notification can include executable code corresponding to the updated encoder or to change existing encoder information, configuration information utilized to configure an instantiated updated encoder, or an identification of location of executable code or configuration information.

At block 504 the management component 124 instantiates, or causes to be instantiated, an updated encoder 122B. As described above, in one embodiment, the encoder component 122B can be implemented as physical computing devices or virtualized computing devices in a computing network. In another embodiment, the encoded component 122B may be implemented as logical components in a virtual computing network in which the functionality of the encoder components are implemented by an underlying substrate network of physical computing devices. In this embodiment, the logical encoder components may not be actually instantiated in the physical computing devices of the substrate network. Accordingly, reference to instantiation of the encoder components can correspond to a configuration of physical computing devices functioning as encoder components, instantiation of virtualized computing devices functioning as encoder components or instantiation of logical components in a virtualized network. Illustratively, the instantiation of the updated encoder component 122B includes configuration information that will allow the encoder component 122B to generate output that is substantially compatible or similar to the output of the target encoder component 122A, including encoding format, encoding process, synchronization information and the like.

At block 506, the management component 124 can facilitate exchange of timing and synchronization information and negotiate a handover or stop event between the target encoder component 122A and updated encoder component 122B. As described above, in one embodiment, the updated encoder component 122B can initiate a notification to the target encoder component 122A that a handover will be occurring. In this embodiment, block 506 may be optional or more limited. In other embodiments, the management component 124 may initiate the notification or transmit the timing and synchronization information. At block 508, the management component 124 receives notification of the determination of the handover event or determines that a handover event has occurred and causes a shutdown or modification of the target encoder component 122A or receives notification of such an occurrence. As described above, the target encoder component 122A can cause a shutdown or ceasing of operations, designate its operations with some identifiers or otherwise designate the generated output as able to be discarded or having a lower priority that outputs from the updated encoder component 122B. In the case of a logical implementation of the target encoder component 122A, the underlying substrate network can cause the logical component to "cease" operating by no longer emulating the function or replacing with the emulation of a different logical component. Additionally, the target encoder component 122A can generate a notification regarding the determination of the handover event and confirmation of a change in operation. At block 510, the routine 500 terminates.

Figure 6:
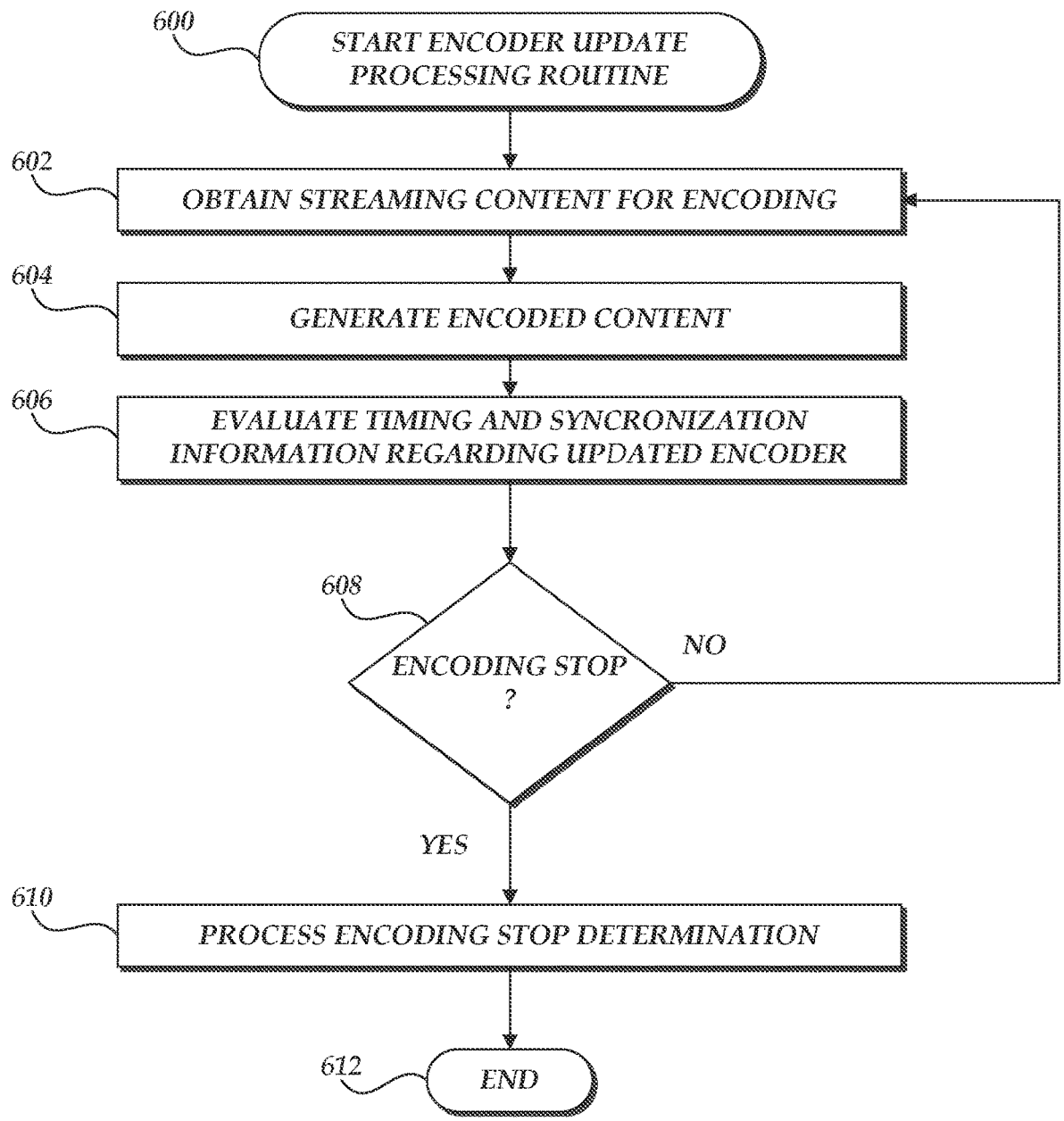
FIG. 6 is a flow diagram illustrative of an encoder update processing routine implemented by an encoder in accordance with some embodiments.

Turning now to FIG. 6, a routine 600 for encoder update processing will be described. Illustratively, routine 600 will be described with regard to implementation by the target encoder component 122A after a notification from the updated encoder component 122B has been received and timing/synchronization information has been exchanged. At block 602, the target encoder continues to receive or access the content for transmission. At block 604, the target encoder component 122A and updated encoder component 122B encode the content according to the same one or more encoding profiles (e.g., combinations of encoding bitrate and format) corresponding to the content streams being provided to the requesting entities. As described above, by way of example, examples of encoding formats include but not limited to the motion pictures expert group ("MPEG) MPEG-2 Part 2, MPEG-4 Part 2, H.264 (MPEG-4 Part 10), H.265 high efficiency video coding ("HEVC"), Theora, RealVideo RV40, VP9, and AOMedia Video 1 ("AV1"), and the like. At block 604, the target encoder component 122A generates outputs. Illustratively, at this point in the illustration, the video packaging and origination service 120 would include additional functionality or components that would be able to receive both output content streams and either discard the updated encoder component 122B stream.

At block 606, the target encoder component 122A evaluates the timing and synchronization information to determine whether a handover or stop event has occurred. For example, the handover event can correspond to an identification of a frame number in the encoded content stream or a timestamp associated with the content stream. At decision block 608, a determination is made as to whether a handover or stop event has been determined. If not, the routine 600 will return to block 602 in which the target encoder component 122A will continue to generate outputs illustratively in parallel with the updated encoder component 122B.

If at decision block 608, it is determined that a handover or stop event has occurred, at block 610, the target encoder component 122A processing the encoding stop event or handover event. As described above, the target encoder component 122A can cause a shutdown or ceasing of operations, designate its operations with some identifiers or otherwise designate the generated output as able to be discarded or having a lower priority that outputs from the updated encoder component 122B. In the case of a logical implementation of the target encoder component 122A, the underlying substrate network can cause the logical component to "cease" operating by no longer emulating the function or replacing with the emulation of a different logical component. Additionally, the target encoder component 122A can generate a notification regarding the determination of the handover event and confirmation of a change in operation. At block 612, the routine 600 terminates or begins another iteration of routine 600.

Figure 7:
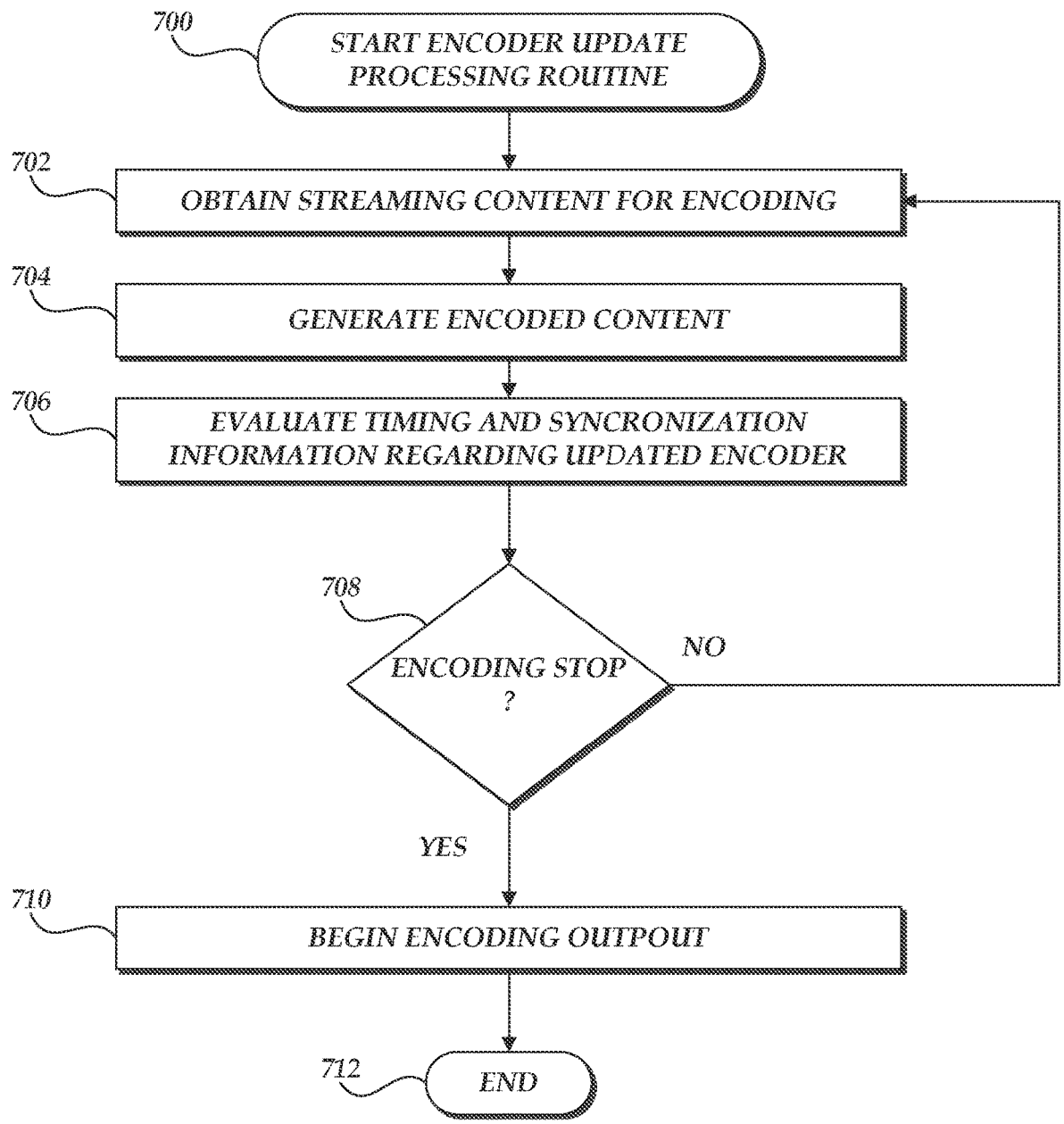
FIG. 7 is a flow diagram illustrative of an encoder update processing routine implemented by an encoder in accordance with some embodiments.

Turning now to FIG. 7, a routine 700 for encoder update processing will be described. Illustratively, routine 600 will be described with regard to implementation by the updated encoder component 122B after the updated encoder component 122B has been instantiated. At block 602, the updated encoder component 122B begins to receive or access the content for transmission. At block 704, the updated encoder component 122B encode the content according to the same one or more encoding profiles (e.g., combinations of encoding bitrate and format) corresponding to the content streams being provided to the requesting entities. As described above, by way of example, examples of encoding formats include but not limited to the motion pictures expert group ("MPEG) MPEG-2 Part 2, MPEG-4 Part 2, H.264 (MPEG-4 Part 10), H.265 high efficiency video coding ("HEVC"), Theora, RealVideo RV40, VP9, and AOMedia Video 1 ("AV1"), and the like. At block 704, the target encoder component 122A continues to generate outputs. Illustratively, at this point in the illustration, the video packaging and origination service 120 would include additional functionality or components that would be able to receive both output content streams and either discard the updated encoder component 122B stream.

At block 706, the updated encoder component 122B evaluates the timing and synchronization information to determine whether a handover or stop event has occurred. For example, the handover event can correspond to an identification of a frame number in the encoded content stream or a timestamp associated with the content stream. At decision block 708, a determination is made as to whether a handover or stop event has been determined. If not, the routine 700 will return to block 702 in which the updated encoder component 122B will continue to wait in parallel with the target encoder component 122A.

If at decision block 708, it is determined that a handover or stop event has occurred, at block 710, the updated encoder component 122B processes the encoding stop event or handover event. More specifically, the updated encoder component 122B can begin generating encoded outputs in place or at a higher priority that target encoder component 122A. At block 712, the routine 700 terminates or begins another iteration of routine 700.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system to manage encoder components comprising:
one or more computing devices associated with a first encoder component, wherein the first encoder component is configured to:
generate first encoded output;
receive notification of an update from a second encoder component;
transmit first synchronization information to the second encoder component, the first synchronization information used to identify a handover event; and
responsive to a determined handover event, designate the first encoded output to have a lower priority than second encoded output of the second encoder component; and
one or more computing devices associated with the second encoder component, wherein the second encoder component is configured to:
generate the second encoded output at a same time as the first encoder component, wherein the second encoded output is substantially the same as the first encoded output;
transmit second synchronization information to the first encoder component, wherein the transmitted first and second synchronization information defines criteria for determining the handover event; and
responsive to the determined handover event, generate the second encoded output at a higher priority than the first encoded output;
wherein the first and second encoder components identify the handover event based on the first and second transmitted synchronization information.

2. The system of claim 1, wherein the second encoder component initiates a negotiation to identify the handover event.

3. The system of claim 1, wherein the first and second synchronization information includes at least one of timestamp information, time code, and sequence number.

4. The system of claim 1, wherein one of the first and second encoder components determines the handover event.

5. The system of claim 1, wherein the handover event corresponds to a frame number in the first or second encoded output or a time associated with streaming.

6. The system of claim 1, wherein the first encoder component is further configured to cease transmission of the first encoded output responsive to the lower priority designation.

7. A computer-implemented method to deliver content, the method comprising:
obtaining, at a target encoder component, notification from an updated encoder component;
obtaining, at the target encoder component, content for encoding at the target encoder component;
generating, at the target encoder component, first encoded output based on the obtained content;
identifying, by the target encoder component, handover event criteria based on exchanged synchronization information between the target encoder component and the updated encoder component, wherein the target encoder component and the updated encoder identify a handover event based on the exchanged synchronization information;
determining the handover event has occurred;
designating, by the target encoder component, the first encoded output of the target encoder component to have a lower priority than a second encoded output of the upgraded encoder component; and
generating, by the target encoder component, the first encoded output at a lower priority than the second encoded output of the updated encoder component, wherein the second encoded output of the updated encoder component is substantially the same as the first encoded output of the target encoder component.

8. The computer-implemented method of claim 7, wherein the target encoder component includes at least one of a physical computing device or virtual instantiation of an encoder component.

9. The computer-implemented method of claim 7, wherein the target encoder component includes a logical encoder component corresponding to a virtual network.

10. The computer-implemented method of claim 7 further comprising receiving information regarding updates to the target encoder component at the updated encoder component.

11. The computer-implemented method of claim 10, wherein receiving information regarding updates to the target encoder component at the updated encoder component includes receiving executable code.

12. The computer-implemented method of claim 10, wherein the updates to the target encoder component include an identification of configuration information.

13. The computer-implemented method of claim 7 further comprising ceasing transmission of the first encoded output from the target encoder component responsive to the lower priority designation of the first encoded output of the target encoder component.

14. The computer-implemented method of claim 7, wherein the handover event corresponds to a frame number in the first encoded output of the target encoder component, a frame number in the second encoded output of the updated encoder component, or a time associated with streaming.

15. A computer-implemented method to deliver content, the method comprising:
obtaining notification at a first encoder component from a second encoder component;
exchanging synchronization information between the first and second encoder components, wherein the first and second encoder components negotiate to identify a handover event based on the synchronization information;
determining the handover event has occurred;
designating, by the first encoder component, first encoded output of the first encoder component to have a lower priority than second encoded output of the second encoder component, wherein the second encoded output of the second encoder component is substantially the same as the first encoded output of the first encoder component; and generating, by the first encoder component, the first encoded output at a lower priority than the second encoded output of the second encoder component.

16. The computer-implemented method of claim 15, wherein the notification includes handover criteria.

17. The computer-implemented method of claim 15, wherein the handover event is based on identification of a frame number in the first encoded output of the first encoder component.

18. The computer-implemented method of claim 15, wherein the first and second encoder components encode content according to a same one or more encoding profiles corresponding to content streams being provided to requesting entities.

19. The computer-implemented method of claim 18, wherein the handover event is based on identification of a timestamp associated with the content streams.

20. The computer-implemented method of claim 15 further comprising generating, by the first encoder component, a notification regarding the determination of the handover event and a confirmation of a change in operation.

* * * * *